United States Patent [19]

Griffee, Jr. et al.

[11] 4,247,258
[45] Jan. 27, 1981

[54] COMPOSITE WIND TURBINE BLADE

[75] Inventors: Donald G. Griffee, Jr., Enfield, Conn.; Chester J. Gruska, Jr., Agawam, Mass.

[73] Assignee: United Technologies Corporation, Hartford, Conn.

[21] Appl. No.: 960,327

[22] Filed: Nov. 13, 1978

[51] Int. Cl.³ .............................................. F03D 1/06
[52] U.S. Cl. ..................................... 416/230; 416/226
[58] Field of Search ........... 416/226, 229, 230, 241 A; 156/185, 190, 191; 244/123

[56] References Cited

U.S. PATENT DOCUMENTS

| | | | |
|---|---|---|---|
| 2,175,204 | 10/1939 | Lougheed | 416/230 |
| 2,202,014 | 5/1940 | Lougheed | 416/230 |
| 2,941,911 | 6/1960 | Kumnick | 156/188 |
| 2,960,753 | 11/1960 | Robertson | 156/187 |
| 3,490,983 | 1/1970 | Lee | 156/191 |
| 3,562,085 | 2/1971 | Crandal et al. | |
| 3,713,753 | 1/1973 | Brunsch | 416/230 A |
| 3,784,428 | 1/1974 | Willats et al. | 156/174 |
| 3,883,267 | 5/1975 | Baudier et al. | 416/230 |
| 3,943,020 | 3/1976 | Ashton et al. | 156/156 |
| 4,081,220 | 3/1978 | Andrews | 416/230 A |

*Primary Examiner*—Everette A. Powell, Jr.
*Assistant Examiner*—A. N. Trausch, III
*Attorney, Agent, or Firm*—John D. Del Ponti; John Swiatocha

[57] ABSTRACT

A blade for a wind turbine has a shell of nonuniform wall thickness and is fabricated by helically winding in a single pass a plurality of turns of a filament-reinforced tape around a form with each successive turn of the tape overlapping the preceding one in an amount sufficient to establish desired thickness, the thickness varying along the length of the blade.

3 Claims, 5 Drawing Figures

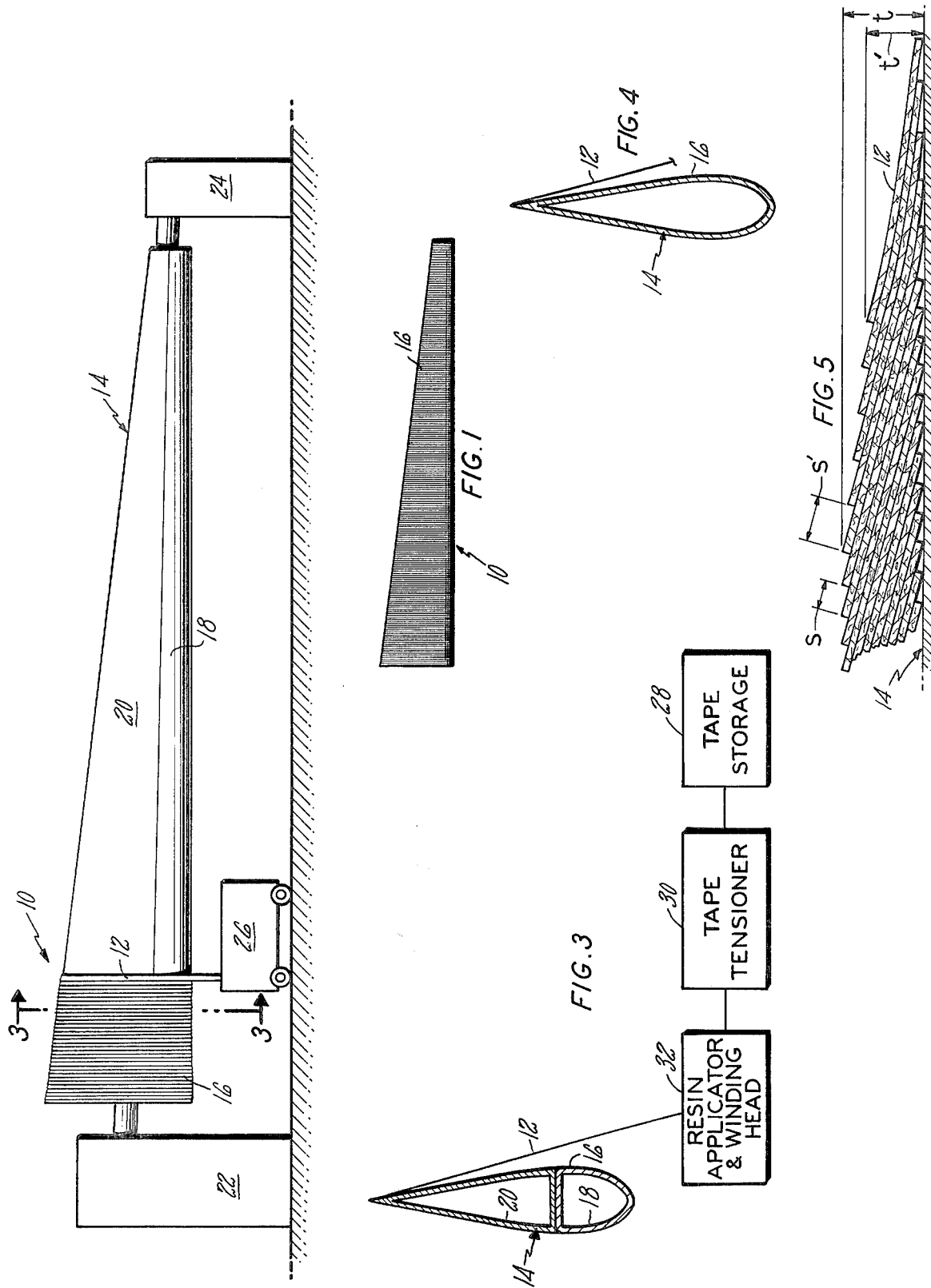

COMPOSITE WIND TURBINE BLADE

BACKGROUND OF THE INVENTION

1. Field of Invention

The present invention relates to wind turbine blades and more particularly to the production of a simple, extremely lightweight filament-reinforced blade of nonuniform wall thickness.

2. Description of the Prior Art

In the current press for new forms of energy sources, one attractive candidate has been the wind turbine. In general, a wind turbine comprises an arrangement of rotor blades, hub, pitch change mechanism, gear box, tower, generator and typically an electrical interface, all adapted to extreme energy from atmospheric winds and convert it into electrical or other useful forms of energy.

A key portion of the wind turbine is its extremely long rotor blades, which may be as long as 100 feet or more and which are subjected to severe bending and twisting at design loadings. Currently favored blade designs include fabrication by either the lay-up of separate composite panels or sheets or the multiple winding of individual filaments or bundles of filaments. One example of the latter technique is disclosed in U.S. Pat. No. 4,081,220 issued on Mar. 28, 1978 and owned by assignee common to the present invention, which disclosure is incorporated herein by reference.

SUMMARY OF THE INVENTION

It is an object of the present invention to provide a wind turbine blade of nonuniform, relatively thin wall thickness which is extremely simple to manufacture.

The invention contemplates the production of a wind turbine blade which tapers from base to tip and which includes a hollow shell having a wall of nonuniform thickness, the wall being comprised of a plurality of overlapping turns of filament-reinforced tape with the amount of overlap varying to control thickness. In general, the turns are helical with respect to the longitudinal axis of the blade and are disposed in a single layer.

The present invention includes the method for making such a blade and comprises the helical winding in a single pass of plurality of turns of a filament-reinforced tape on a shell form about the longitudinal axis of the form to fashion the blade, with successive of the tape turns overlapping in amounts which vary to establish the desired wall thickness.

BRIEF DESCRIPTION OF THE DRAWINGS

An understanding of the invention will become more apparent to those skilled in the art by reference to the following detailed description when viewed in light of the accompanying drawings wherein:

FIG. 1 is a plan view of a wind turbine blade;

FIG. 2 is a plan view of a spar-shell wind tubrine blade and associated apparatus during production;

FIG. 3 is a cross-sectional view along the line 3—3 in FIG. 2;

FIG. 4 is a cross-sectional view of a monocoque blade during production; and

FIG. 5 is a detailed view of a portion of the tape windings during fabrication.

DETAILED DESCRIPTION OF THE PREFERRED EMBODIMENT

In the drawings, FIG. 1 shows a wind turbine blade 10 while FIG. 2 shows a wind turbine blade of the spar-shell type in the process of fabrication. As shown, the blade 10 is formed by helically winding a filament-reinforced tape 12 about a form 14 to fashion a shell 16 in a single pass. For the purposes of this invention, the term tape means a generally elongated continuous material having a width to thickness ratio of at least 50 to 1. The tape is generally a monolayer composite tape comprised of high strength filamentary reinforcing material embedded in a suitable matrix, such as epoxy resin. While the reinforcing material may be selected from many available filamentary materials, it is preferably woven fiberglass so that reinforcement is provided along both the longitudinal and transverse axes of the blade.

In the embodiment illustrated in FIGS. 2 and 3, the form 14 comprises a spar 18 and a removable trailing edge mandrel 20 to permit fabrication of a blade of the spar-shell type. As shown in FIG. 4, form 14 may instead be a single blade-shaped mandrel in order to permit fabrication of a monocoque blade. As will be appreciated, while detailed discussion will conveniently be concentrated on the manufacture of the shell 16, the present invention is not intended to be so limited. It is applicable, for example, to the fabrication of the spar 18 or other similar hollow structural objects. Returning now to FIG. 2, it will be understood that the spar 18 is removably affixed to trailing edge mandrel 20 with the spar and mandrel rotatably supported by floor-mounted support structures 22 and 24 at opposite ends.

Adjacent the blade 10 is a tape applicator 26 which is movable in a direction parallel to the longitudinal axis of the blade. As shown schematically in FIG. 3, the applicator preferably contains a supply 28 of tape 12, a tape tensioner 30 of conventional design for maintaining tension on the tape and a resin applicator and winding head means 32. The means 32, while not shown in detail, is also of known configuration and applies resin to the tape prior to passage of the tape through the winding head. As the form 14 is rotated, the tape applicator 26 moves from the base toward the tip of the blade to provide overlapping helical windings of the tape on the form 14. Thus, as the tape 12 issues from storage 28, it is properly tensioned and resin is applied thereto as it wound about the form 14. Of course, in the alternative, the tape may already be precoated with resin, i.e., in the form of a prepreg, in which case the resin application apparatus and step may be omitted.

Although FIG. 2 depicts the tape being wound at a lead angle of essentially 90°, it will be appreciated by those skilled in the art that the lead angle, as well as the tape lead, tape width, thickness and filament type, content and orientation, may be varied according to design requirements to produce adequate torsional and bending stiffness within the airfoil section limitations. If the lead angle is other than 90°, it will of course be recognized that the winding head must have motion along several axes so that the tape, during winding, will always issue flat from the winding head with respect to the shell form surface as the winding head traces its path along the surface. In such case, the winding head may be movable along axes which are parallel to the blade axis as well as perpendicular to it in both a horizontal and vertical direction and also rotatable about the aforesaid horizontal perpendicular axis.

Referring now to FIG. 5, it can be seen that the tape is initially helically wound with succeeding turns partially overlapping each preceding one by a fixed amount to provide an initial tape lead "s" and an initial shell wall thickness "t". In order to decrease thickness of the wall, the tape lead is increased to s' which causes a deccreased wall thickness t'. By thus simply varying tape lead, wall thickness may be controlled as desired.

Upon completion of the single winding, blade fabrication is essentially complete, except for minor operations, such as the application of a finish coating of, for example, conductive polyurethane, for enviornmental protection purposes.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A wind turbine blade tapering from base to tip including a hollow shell having a wall of nonuniform thickness, said shell wall comprising a plurality of overlapping turns of filament-reinforced tape of selected tape lead disposed as a single layer, said tape lead varying from said base to said tip to establish said thickness.

2. The invention of claim 1 wherein said wall thickness diminishes from base to tip.

3. The invention of claim 2 wherein the lead angle of said tape is essentially 90°.

* * * * *